United States Patent [19]

McGinniss et al.

[11] 4,204,932

[45] May 27, 1980

[54] PROCESS FOR ELECTRODEPOSITION OF COMPOSITIONS CONTAINING CARBAMOTHIOATE CURING AGENTS

[75] Inventors: Vincent D. McGinniss, Valley City; Donald R. Stevenson, Dover, both of Ohio

[73] Assignee: SCM Corporation, New York, N.Y.

[21] Appl. No.: 942,994

[22] Filed: Sep. 18, 1978

Related U.S. Application Data

[62] Division of Ser. No. 812,801, Jul. 5, 1977, Pat. No. 4,133,916.

[51] Int. Cl.$^2$ ............................................. C25D 13/10
[52] U.S. Cl. ............................. 204/181 R; 204/181 C
[58] Field of Search ......................... 204/181 C, 181 R

[56] References Cited

U.S. PATENT DOCUMENTS 4,147,679    4/1979    Scriven et al. .................. 204/181 C

*Primary Examiner*—Howard S. Williams
*Attorney, Agent, or Firm*—Merton H. Douthitt; Jerry K. Mueller, Jr.

[57] ABSTRACT

An ungelled composition of matter comprising a compound containing groups reactive with isocyanate, a compound containing groups reactive with mercaptan, and a carbamothioate curing agent adapted to generate a plurality of curing units upon being subjected to heating above about critical temperature. The generated curing units contain isocyanate groups, mercaptan groups, or combinations thereof. In preferred embodiments of this invention, the ungelled composition is adapted for use in powder coatings, anodic electrocoating, and cathodic electrocoating.

9 Claims, No Drawings

PROCESS FOR ELECTRODEPOSITION OF COMPOSITIONS CONTAINING CARBAMOTHIOATE CURING AGENTS

This is a division of application Ser. No. 812,801, filed July 5, 1977, now U.S. Pat. No. 4,133,916.

The present invention relates to a new composition of matter adaptable to a wide variety of uses.

The ungelled composition of matter disclosed herein comprises:

(A) a compound containing at least about $f_m$ groups, each reactive with an isocyanate group;

(B) a compound containing at least about $f_n'$ groups, each reactive with a mercaptan group; and (C) a carbamothioate curing agent adapted to generate a plurality of curing units upon being subjected to heating above about critical temperature, said curing units containing m isocyanate groups and n mercaptan groups, here m and n are integers each of value of at least 2.

Referring to the curing agent, the carbamothioate (carbamothiolic acid ester) curing agent is of linear or branched structure having structural units represented by

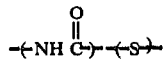

(a carbamothioate group or linkage). The carbonylsulfur bond which joins such structural units is heat sensitive wherein such bond is severable at a critical temperature under heat-curing conditions for formation of a plurality of curing units, each having either isocyanate functionality, mercaptan (or thiol) functionality, or combinations of such functionalities. Without subjecting such curing agent to critical heating, the carbamothioate is quite stable and can be utilized and adapted for use in a wide variety of applications. Thus, in one sense, the curing agent can be thought of as a masked or blocked isocyanate curing agent wherein a mercaptan or thiol group is the blocking agent; and in another sense, as a mercaptan-functional curing agent which is blocked or masked with an isocyanate group. The particular characterization of the curing agent is not limitative of the present invention as the curing agent is adapted and designed to release or generate individual curing units under heat curing conditions wherein some of the curing units have reactive isocyanate groups and some of the curing units have reactive mercaptan groups for superior performance of the instant curing agent.

Though the sulfur-carbon bond (carbon of the carbonyl group) of the carbamothioate can be broken by heating to its critical temperature, the carbamothioate curing agent is quite staple at lower temperatures and can be utilized in a wide variety of applications, some of which require heat treating of the composition of matter such as in the formation of powder coatings. The curing agent additionally is quite stable when subjected to the influence of externally applied voltage and, thus, is quite useful in electrocoating applications. The critical temperature (or critical temperature range) at which the sulfur-carbon bond can be broken broadly can range from about 100° to about 250° C. (heat-curing conditions) and the critical temperature can be pre-determined fairly precisely by particular choice of curing agent, compounds (such as resins or polymers) which are combined with the curing agent for cross-linking by the curing agent, and the particular use to which the composition is being adapted. For example, highly polar or electron withdrawing groups attached to the sulfur atom of the curing agent tend to promote breaking of the carbon-sulfur bond at a lower critical temperature, whereas rather straight-chained aliphatic groups attached to the sulfur atom tend to raise such critical temperature for breaking of the bond. Similarly, particular constituent groups attached to the nitrogen atom (which is attached to the carbonyl of the curing agent) will also influence the critical temperature at which the sulfur-carbon bond is broken and the plurality of curing units released. The Examples which follow will further illustrate this point. While not intending to be bound by theory, the proposed reaction mechanism which is thought to be involved in the breaking of the sulfur-carbon bond appears to be via an ionic reaction mechanism wherein the leaving sulfur group acts as a weak base while the nitrogen of the leaving isocyanate-forming group appears to act as an acid wherein the unshared pair of electrons of the leaving sulfur group are fulfilled by the addition of the hydrogen of the nitrogen (formation of a mercaptan) and resulting in the formation of a nitrogen-carbon double bond (formation of an isocyanate group).

In particular applications of the present composition of matter, it can be fairly critical to precisely control the critical temperature at which the curing agent is split apart to yield a plurality of curing units. For example, in powder coatings applications it is desired that the powder coating initially melt and flow to provide good coverage of the substrate at a lower temperature followed by curing of the molten coating at a higher (or critical) temperature. The present curing agents can be specially designed and adapted to flow at lower temperatures and provide cure at higher temperatures. In electrocoating adaptations of the present composition of matter, the curing agent need only be dispersible in the aqueous electrocoating bath and be adapted to simultaneously co-deposit with the appropriate cationic or anionic resins, depending upon the particular mode of operation of the electrocoating process. In these cases, the curing agent advantageously will split apart to provide the curing units at lower temperatures for economy and efficiency of curing the electrodeposit coating, and need only be stable in the bath and under the influence of the applied voltage in the bath. In other uses of the curing agent of the present invention, the particular applications normally will dictate the critical temperature (or heat curing conditions) to which the curing agent must respond.

Typically, synthesis of the curing agent is routine though more sophisticated techniques often can provide specially designed curing agents especially valuable in particular applications. Generally, the curing agent is synthesized by the reaction of an isocyanate-functional compound with a mercaptan (or thiol) compound in the presence of appropriate catalysts. Both the isocyanate compound and the mercaptan compound can be multifunctional and can be attached to a monomer, oligomer or polymer. On certain occasions, it is desirable to have the curing agent attached to one of the resins or polymers which additionally comprise the present composition of matter and this can be accomplished without much difficulty as can be seen by the examples which follow. At least one of such components of the curing agent (the isocyanate compound or the mercaptan compound) must be multifunctional for providing crosslinking of the present composition of matter. Also, a few of the isocyanate and/or mercaptan groups may not be fully reacted in synthesizing the present curing agents and it is conceivable that these to some degree may pre-react with the compounds combined with the curing agent under certain conditions, though, this is strictly limited so that the present composition of matter is ungelled at temperatures and conditions of less than the critical temperature under heat curing conditions (which are required to fully gel or cross-link the present composition of matter).

The isocyanate compounds useful in formulating the present curing agents can be aliphatic or aromatic isocyanate compounds and can be in the form of a monomer, oligomer, or polymer. Typical isocyanates include, for example, toluene diisocyanate, isophorone diisocyanate, ethylene, trimethylene, tetramethylene, pentamethylene, hexamethylene, propylene-1,2, butylene-1,2, butylene-2,3, butylene-1,3, ethylidene and butylidene diisocyanates; cyclopentylene-1,3, cyclohexylene-1,4, and cyclohexylene-1,2, diisocyanates; m-phenylene, p-phenylene, 4,4'-diphenyl, 1,5-naphthalene, and 1,4-naphthalene diisocyanates; 4,4'-diphenylene methane, 2,4-tolylene, 4,4'-tolidine, and 1,4-xylylene diisocyanates; dianisidene diisocyanate, 4,4'-diphenyl ether diisocyanate and chloro-diphenylene diisocyanate; 4,4',4''-triisocyanto triphenyl methane, 1,3,5-triisocyanto benzene, and 2,4,6-triisocyanto toluene; and 4,4'-dimethyldiphenyl methane 2,2'-5,5'-tetraisocyanate.

Representative mercaptan compounds or thiol compounds useful in the present invention include, for example, monododecanethiol, didodecanethiol, dithiophenol, di-para-chlorolthiophenol, dimercaptobenzthiazole, 3,4-dimercaptotoluene, allyl mercaptan, 1,6-hexanedithiol, mercaptoacetic acid, benzyl mercaptan, 1-octanethiol, p-thiocresol, 2,3,5,6-tetraflurothiophenol, cyclohexylmercaptan, methylthioglycolate, mercaptopyridines, dithioerythritol, 6-ethoxy-2-mercaptobenzothiazole, and the like. Further useful mercaptans can be found in the 1970-1978 *Catalog Handbook of Organic and Biochemicals*, catalogue no. 18, Aldrich Chemical Company, Inc., Milwaukee, Wis.

The curing agent is combined with a compound containing at least about $f_m$ groups each reactive with an isocyanate group (hereinafter referred to as compound A). Referring to compound A, such compound can be a monomer, oligomer, or polymer, depending upon the particular use to be made of the composition of matter and the performance which the composition of mattter should display. Groups which are reactive with an isocyanate group generally are classified as those groups containing a labile hydrogen atom. There should be about $f_m$ of such groups which are adapted to link with the isocyanate-functional curing units of the curing agent. There are M isocyanate groups formed from the curing agent and there should be about the same number of more labile hydrogen atom-containing groups with respect to the isocyanate groups of the curing agent. Generally M will range from about 2 to 10 and more often from about 2 to 5. Compound A can be a polyester, polyether, vinyl, acrylate, polyurethane, polyamine, and similar compounds provided they have the requesite functionality reactive with an isocyanate group. Representative groups reactive with an isocyanate group include: alcohols, amines, carboxyl groups, urethanes, ureas, oximes, phenols, enols, silyl amines, and the like.

Compound B contains at least about $f_n'$ groups each reactive with a mercaptan group. Compound B, like Compound A, can be a monomer, oligomer, or polymer depending upon the particular application of the composition of matter and the performance characteristics desired of the composition of matter. There are N mercaptan groups formed from the curing agent and at least about N groups which are reactive with such mercaptan group. Generally N will range from about 2 to 10 and more often from about 2 to 5. Representative groups which are reactive with the mercaptan group include unsaturated carbon-carbon groups such as typified by allyls, vinyls, acrylates, acrylamides, ethylenically unsaturated dibasic and polybasic acids, (poly)-butadienes, and like unsaturated groups; epoxies; and amine groups which undergo a replacement reaction with the mercaptan group according to the reaction procedure taught in U.S. Pat. No. 2,417,118, the disclosure of which is expressly incorporated herein by reference.

It is quite conceivable that a single compound can contain both the reactive groups of Compound A and the reactive groups of Compound B and synthesis of such compounds generally is quite simple and well known to those skilled in the art. For example, a single compound containing both such functionalities can be, for example, an unsaturated polyester containing hydroxyl groups, a (poly)acrylate containing pendant amine groups, and similar compounds containing both reactivities. It also can be useful on occasion to attach the curing agent to at least one of such compounds and even to a single compound containing both functionalities. In electrocoating uses of the instant composition of matter, it can be highly advantageous to have the curing agent directly attached to the particular electrocoating resin so that uniform deposition of the curing agent along with the charged polymer can be practiced. Further on this will be found in the examples which follow.

In powder coatings applications of the present invention, compounds (A) and/or (B) are polymers or resins especially adapted to meet the stringent requirements of this field. Powder coatings can be made, for example, by dispersing the ingredients (compounds (A) and (B) and the curing agent) in a fugative solvent and spray-drying the resulting dispersion to form a uniform, intimate blend of particles, such as shown in U.S. Pat. No. 3,561,003, incorporated herein by reference. Alternatively, the ingredients can be consolidated into a hot melt and extruded with the extrudate then being ground to powdered form; such as shown in SME Technical Paper No. FC 72-948, presented at the powder coatings meeting of the Society of Manufacturing Engineers (Cincinnati, Ohio 1972), incorporated herein by reference. Other known ways of manufacturing powder coatings can be used advantageously and the following reference is particularly good in teaching the powder coating art, M. W. Raney, "Powder Coating Technology," *Chemical Technology Review*, No. 45, Notes Data Corporation, Park Ridge, New Jersey (1975), the same incorporated herein by reference.

Nominal particle size of powder coatings ranges from about 30 to about 150 microns average diameter and preferably are spherical in geometrical shape. Generally, the powder is applied to a substrate by electrostatic spraying, though other techniques such as fluidized bed operations can be utilized. Preferably, the powder coating is non-fusible at temperatures of up to about 50° C. so that end-gun or nozzle pluggage is minimized. The applied powder coating is heated for effecting flow-out and good coverage initially without realizing cure or gel of the powder coating. Typically, the powder coating has a Tg (glass transition temperature) of at least about 55° C. and preferably around 60°–95° C. for best performance of the powder coating. With longer times of heating or at increased temperatures, the flowed-out coating cures to form a fully-cured coating on the substrate.

The present carbamothiolic acid ester curing agent is ideally suited to powder coating applications for a variety of reasons including that the critical temperature of the curing agent can be pre-determined and regulated with good accuracy. The powder coating then can be made to have the requisite Tg and be substantially non-fusible upon application. Further, the present powder coating can be heated at a temperature below the critical temperature (or above the critical temperature for short times of heating) to effect good flow-out and coverage. Also, there are virtually no volatiles emitted from the curing agent during heat-curing operations for better performance of the coating and reduced pollution emission problems.

In anodic electrocoating applications of the present composition, compounds (A) and/or (B) preferably are polymers or resins especially adapted for use in this field. Such compounds are made to be anionic (negatively charged) so that during electrodeposition operations, such compounds will migrate to the anode and be deposited therein. It should be understood, though, that of compound A, compound B, or the carbamothioate curing agent, only one of these need be charged and the others will be carried to the anode by the charged species as is well known in this art. Typically, such compounds are made anionic by providing a multiplicity of carboxyl groups on the compounds. The anionic compounds are dispersed in the electrocoating bath by adding an amino-compound thereto to provide negatively charged functionality from the carboxyl groups of the compound. Suitable amino-compounds, for example, include monoethanol amine, diethanol amine, triethano amine, monoethyl amine, diisopropyl amine, trimethylamine, cyclohexylamine, and the like and mixtures thereof.

The anodic electrocoating composition is dispersed in the electrocoating bath at about 5 to about 20% non-volatiles solids at about 15° to 50° C. The anode substrate then is immersed in the bath while an electric potential is maintained therethrough. Electric potential often range between about 20 and 500 volts, with about 50 to 300 volts being preferred. In order to maintain the ratio of anodic polymer to curing agent fairly constant, it can be advantageous to have the curing agent directly attached to the anodic polymer (or one of them if there are two or more anodic polymers in the bath) so that uniform deposition on the anode substrate is maintained. Further on practice of anodic electrocoating can be found in *Advances in Electrophoretic Painting* 1971–1972, R. H. Chandler Limited (May 1973).

In cathodic electrocoating applications of the present composition, compounds (A) and/or (B) are polymers or resins especially adapted for use in this field. Such compounds are made to the cationic so that during electrodeposition they will migrate to the cathode substrate and be deposited thereon. Of course, only one compound (A or B) or the curing agent need be charged. Suitable cationic functionality can be provided in the form of onium groups such as sulfonium groups, phosphonium groups, ammonium group (quaternary ammonium group); and from amine groups suitably protonated with a proton-denoting acid. Further on this can be found in *Advances in Electrophoretic Painting* 1973–1974 - *Cathodic Electropainting*, R. H. Chandler Limited (March 1975).

The cationic polymer and curing agent are dispersed in the electrocoating bath at about 5% to about 20% non-volatiles solids at about 15° to 50° C. An electric potential of about 20 to 500 volts is maintained therethrough for deposition of the cathodic composition onto the cathode substrate. As mentioned for aniodic electrocoating, it can be similarly advantageous to directly attach the curing agent to the cathodic polymer.

Of course the present composition can be dispersed in an aqueous solvent for conventional application, such as, for example, brushing, rolling, dipping, spraying and the like. In these cases, it can be useful to formulate the coating composition to contain a very high non-volatiles solids content of about 60 to 90% or higher. This can be readily accomplished as the Examples will demonstrate. Similarly, a fugative organic solvent can be used also. Additional uses for the present composition include, for example, laminates, molding compounds, and the like.

A decided benefit of the present composition in any use is that both isocyanate and mercaptan functionalities from the curing agent participate in cure of the composition. High performance of urethane bonds is well known and such bonds (or urethane-type bond such as a urea or the like) are formed from the isocyanate curing units. Of unexpected benefit is the unusually good contribution that the mercaptan curing units provide to the present composition. One benefit is the superior corrosion-inhibition which the mercaptan curing linkages exhibit in the present curable composition. Most conventional isocyanate blocking groups are volatile and are readily volatilized during heat curing operations (e.g. caprolactams), though with special care, some isocyanate blocking groups may be designed to remain in the cured film or even link into the film on rare occasion. The unusual corrosion-protection afforded in the present invention can be seen in the following Example XVII below.

PREPARATION OF CURING AGENTS

EXAMPLE I

To a solution of 17.4 grams of toluene diisocyanate (0.1 mole) and 50 milliliters of toluene, 20.8 grams of dodecanethiol (0.1 mole) containing 0.1% triethylamine catalyst was added slowly over a 12 hour period at room temperature followed by heating at 50° C. for three hours. The resulting monododecanethioltoluene diisocyanate curing agent was analyzed and found to contain 7% free isocyanate (calculated value is 11% free isocyanate). The presence of some free isocyanate was confirmed by infrared spectroscopy.

EXAMPLE II

Into a flask was placed 42.8 grams of dodecane thiol (0.2 moles), 0.1% triethylamine catalyst, and 100 milliliters of toluene. The reaction mixture was maintained at room temperature under slow stirring and 17.4 grams of toluene diisocyanate (0.1 mole) was added dropwise thereto. After the addition of the toluene diisocyanate, the mixture was continued to be stirred for an additional 12 hours followed by heating at 80° C. for three hours until all of the isocyanate was determined to have been reacted. The mixture then was cooled and washed with 50 milliliters of heptane to extract 52 grams of precipitate. The precipitate contained 91% of the desired didodecanethiol-toluene diisocyanate curing agent. The curing agent was determined to have a melting point of 89°–90° C.

EXAMPLE III

The procedure of Example II was repeated except that the TDI was added to a mixture of dithiolphenol dispersed in chloroform and containing DABCO amine catalyst (DABCO is a registered trademark of American Cyanamide Company). The resulting precipitate was found to contain 80% of the desired dithiolphenol-toluene diisocyanate curing agent. This curing agent was determined to have a melting point of 140°–145° C.

EXAMPLE IV

The procedure of Example III was repeated except that di-parachlorothiolphenol was used instead of dithiolphenol. The precipitate yielded 88% of the di-parachlorothiolphenol-toluene diisocyanate curing agent. This curing agent had a melting point of 178° C.

EXAMPLE V

The reaction procedure of Example III was repeated except that the dithiolphenol was replaced with dimercaptobenzothiozole and the chloroform solvent was replaced with toluene solvent. The resulting precipitate was found to contain the desired dimercaptobenzothiozole-toluene diisocyanate curing agent.

EXAMPLE VI

The curing agent was made by the reaction of 0.03 moles of 3,4-dimercaptotoluene, 0.01 moles of parachlorothiolphenol, and 0.04 moles of toluene diisocyanate dispersed in methylethylketone solvent in the presence of 0.1% dibutyltin dilaurate catalyst. The ingredients were heated at about 80°–100° C. until it was determined that no free isocyanate remained in the reaction mixture. The resulting curing agent can be represented conventionally by the following structure:

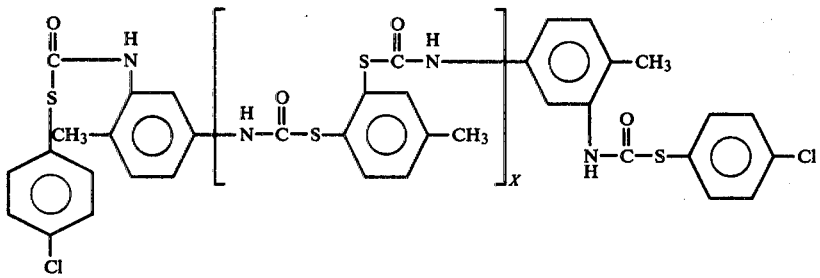

EXAMPLE VII

The reaction procedure of Example VI was repeated except that the reaction mixture contained 1 mole of toluene diisocyanate and 2 moles of parachlorothiolphenol.

POWDER COATINGS/SOLVENTLESS BLENDS EMBODIMENT

In Examples VIII through XIII, the curing agent, compound A, and compound B were placed in aluminum cups, heated to about 160° C., and the curing time recorded (i.e. time at which the composition gelled or cured). The results for these Examples are recorded in Table I below.

In Example XIV, powder coating formulated had the curing agent reacted onto compound A. Compound B then was separately combined with the compound A-curing agent adduct. In Example XV, the powder coating had the curing agent and both compounds A and B reacted into a single molecule.

TABLE I

| EXAMPLE | Curing Agent (wt in gms) | Compound A (wt in gms) | Compound B (wt in gms) | Gel Time (min) |
| --- | --- | --- | --- | --- |
| VIII | Ex. II (3 gms) | (1) hydroxy-terminated polybutadiene (12 gms) | (2) polybutadiene (12 gms) | 2–5 |
| IX | Ex. VII (5 gms) | (3) trihydroxypolyether (5 gms) | (2) polybutadiene (0.1 gms) | 9 |
| X | Ex. VII (8 gms) | (4) epoxy resin-diethanol amine adduct (6 gms) | (5) unsaturated polyester (8 gms) | 3 |
| XI | Ex. VII (8 gms) | (3) trihydroxypolyether (3 gms) | (2) polybutadiene (2 gms) | 20 |
| XII | Ex. VII (4 gms) | (6) styrene-allylalcohol (4 gms) | (2) polybutadiene (2 gms) | 15 |
| XIII | Ex. VII (2 gms) | (4) epoxy resin-diethanolamine added | (7) epoxy resin (1.7 gms) | |

TABLE I-continued

| EXAMPLE | Curing Agent (wt in gms) | Compound A (wt in gms) | Compound B (wt in gms) | Gel Time (min) |
|---|---|---|---|---|
| | | (1 gm) | | 4 |

(1) R-15M, a liquid hydroxy-terminated polybutadiene, MW of 3000–3500, hydroxy content of 0.80 meg./gm, hydroxy no. 45 (mg. of KOH), ARCO Corp., Sinclair Petrochemicals Division.
(2) Lithene QH liquid polybutadiene, MW of 3100, Lithium Corp. of America, Bessemer City, North Carolina.
(3) Liquid trihydroxypolyether being the reaction product of 1 mole of trimethylolpropane and 7 moles of propylene oxide ($BF_3$etherate catalyst).
(4) Reaction product of 1 mole of an epoxy resin (DER 332 epoxy resin, epoxy equivalent of 172–196, Dow Chemical Company, Midland, Michigan) and 1 mole of diethanol amine
(5) Unsaturated polyester resin made by the fusion cook at 230° C. of 1 mole of trimethylolpropane, 2 moles of triethylene glycol, 1 mole of 1,6-hexane diol, and 3 moles of maleic anhydride.
(6) RS-100 styrene/allyl alcohol copolymer, MW of 1200–1700, Monsanto Chemical Corp.
(7) DER 332 epoxy resin, epoxy equivalent of 172–196, Dow Chemical Company, Midland, Michigan.

EXAMPLE XIV

The curing agent was prepared by the dropwise addition of 1.1 moles of para-chlorothiophenol dispersed in dry methylethylketone solvent to a flask containing one mole of toluene diisocyanate and 0.1% triethylamine catalyst dispersed in dry MEK solvent. The reaction mixture was held at room temperature until the free isocyanate content was determined to about 5–6%.

The curing agent (130 gms, 70% nonvolatiles in MEK) was added to the styrene-allyl alcohol copolymer of Example XII (200 gms) at room temperature. This reaction mixture then was heated at 40° C. for 3 hours at which time it was determined that no free NCO groups remained in the reaction mixture. The copolymer-curing agent product precipitated from solution as a fine powder. The powder was recovered from the solution and dried.

The dried powder (0.2 gms) was blended with 10 grams of a solid diacetone acrylamide, the blend placed in an aluminum cup and heat-cured. The cured material had no mercaptan odor indicating that it had fully cured.

EXAMPLE XV

The following ingredients were reacted in substantially the same manner as described in Example XIV: 70 grams of a p-chlorothiophenol—TDI adduct (1:1 molar ratio), 60 grams of a hydroxyethylacrylate—TDI adduct (1:1 molar ratio), and 100 grams of the RJ-100 styrene-allyl alcohol copolymer of Example XII.

The powder recovered from the reaction mixture was placed in an aluminum cup and heated to fully cure the powder.

EXAMPLE XVI

The curing agent of Example VI (30 gms) and 100 gms an epoxy resin (DER 664, MW of 1800), epoxy equivalent of 900, Dow Epoxy Resin, Dow Chemical Company) were dispersed in MEK solvent. The solvent was evaporated to yield a uniform solids mixture. This powder was applied to a steel panel and baked at about 205° C. for ten minutes to yield a fully-cured solvent-resistant film on the panel.

ANODIC ELECTROCOATING EMBODIMENT

EXAMPLE XVII

An anodic electrocoating resin was prepared by the solution polymerization of methylmethacrylate (290 parts), ethyl acrylate (230 parts), butylacrylate (320 parts), hydroxyethylacrylate (400 parts), and methacrylic acid (60 parts) dispersed in 600 parts of a 2-butoxy-ethanol-1 solvent. The curing agent was formulated from one mole of a 3,4-di-mercaptotoluene/TDI adduct (1:2 mole ratio) reacted with 2 moles of para-chlorothiophenol in accordance with the procedure of Example VI. Compound B was a 1:1 weight ratio mixture of a ciacrylate of an epoxy resin (2 moles of acrylic acid reacted with 1 mole of the DER 332 epoxy resin of Example XIII) and melamine acrylate (2.7 acrylate functionality).

To the anodic resin was blended 20% by weight of the curing agent and 20% by weight of the epoxy acrylate/melamine acrylate resinous mixture. The blend was neutralized with triethanolamine and dispersed in deionized water to form an electrocoating bath of 10% non-volatile solids dispersion. The anodic electrocoating composition then was anodically electrodeposited onto a steel panel at 100–200 volts for 60–90 seconds. The coated panel was removed from the bath, washed with water, and baked in an oven at 205° C. for 20 minutes. After baking, a fully-cured solvent-resistant film covered the panel.

EXAMPLE XVIII

The procedure of Example XVII was repeated except that the hydroxyethylacrylate in the anodic resin was replaced with glycidylmethacrylate to provide an oxirane-functional anodic resin.

EXAMPLE XIX

The procedure of Example VII was repeated except that the hydroxyethylacrylate in the anodic resin was replaced with methacrylic acid and the resulting anodic resin was reacted further with glycidylacrylate to provide an acrylate-functional anodic resin.

CATHODIC ELECTROCOATING EMBODIMENT

EXAMPLE XX

In 2-butoxy-ethanol-1, one mole of an epoxy resin (DER 664) was reacted with one mole of diethanolamine to form an amino-epoxy resin adduct. This adduct was blended with 20% by weight of the curing agent of Example XVII and 10% by weight of N,N'-para-phenylenedimaleimide. This blend was acidified with acetic acid and added to water to form an electrocoating bath of 8% non-volatiles solids dispersion.

A steel panel was cathodically electrocoated with the cathodic electrocoating composition at 100 volts for minutes, removed from the bath, and washed with water to remove any excess coating. The coated panel then was baked at 205° C. for 30 minutes to provide a fully-cured, solvent-resistance film on the panel.

EXAMPLE XXI

The cathodic resin was prepared from one mole of methylethanolamine reacted with one mole of an epoxy resin (DER 664) in 2-butoxy-ethanol-1. The cathodic resin was blended with 20% by weight of the curing agent of Example VII. The blend was acidified with acetic acid and let down in water to form an electrocoating bath of 8% non-volatiles solids dispersion.

A steel panel was cathodically electrocoated with the composition and baked at 205° C. for 30 minutes. This resulted in a fully-cured, solvent resistant film on the panel.

EXAMPLE XXII

A sulfonium ion copolymer was made by copolymerizing vinyl benzyl sulfonium monomer (1 mole of the reaction product of 1 mole of vinylbenzylchloride with 1 mole of dimethylsulfide), hydroxyethylacrylate (1 mole), butylacrylate (2 moles), and styrene (1 mole). This copolymer was blended with 30% by weight of the curing agent of Example XVII and 30% by weight of melamine acrylate (2.7 acrylate functionality).

The blend was dispersed in water to form an 8% non-volatiles solids dispersion and cathodically electrodeposited onto a steel panel. The coated panel was baked at 205° C. for 30 minutes to produce a fully-cured film on the panel.

EXAMPLE XXIII

A hydroxyl-rich polyester was formulated by the reaction of two moles of succinic anhydride with two moles of propylene glycol and one mole of thiodiethenol followed by the addition of an excess (based on the hydroxyl content of the polyester resin) of 3-mercaptopropionic acid. The resulting mercaptan-terminated polyester resin then was reacted with a carbamothioate curing agent which was the reaction product of 1 mole of 3,4-dimercapto-toluene, 2 moles of TDI, and 1 mole of parachlorothiophenol (prepared according to the procedure of Example VI). One hundred grams of the curing agent-containing cathodic resin then was acidified with 1 mole of acetic acid and 1 mole of methyliodide and blended with 30 grams of a 1:1 weight ratio mixture of melamine acrylate (2.7 acrylate functionality)/epoxy acrylate resin of Example XVII. This blend was dispersed in deionized water to form an 8% nonvolatiles dispersion (electrocoating bath).

A steel panel was immersed in the bath as the cathode and the electrocoating composition electrodeposited thereon at 60 volts for 2 minutes. The coated panel was removed from the bath, washed with water, and baked at 205° C. for 30 minutes. A solvent-resistant coating with no mercaptan odor covered the panel indicating that full curing had taken place.

EXAMPLE XXIV

One mole of the DER 664 epoxy resin of Example XVI was reacted with one mole of nonyl phenol in 2-butoxy-ethanol-1 solvent (20% non-volatiles solution) in the presence of 0.5% of benzyldimethylamine catalyst, followed by a further reaction with the reaction product of one mole of butylthioethanol and one mole of TDI. Next, one mole of trimethylolpropane tri-(beta-mercaptopropionate) was added to form a mercaptan-functional, urethane-modified epoxy resin. The curing agent then was attached to the epoxy resin by the addition of a thiophenol-TDI adduct (1:1 molar ratio) thereto.

This resin was slightly acidified with acetic acid and 1 mole of methyliodide, blended with 30% by weight of a 1:1 weight ratio mixture of DER 332 epoxy resin and pentaerythritol triacrylate, and dispersed in water to form an 8% non-volatile electrocoating bath. A steel panel was coated and cured in a manner similar to that described in Example XXIII.

EXAMPLE XXV

Two moles of TDI was reacted with 0.75 moles of poly-(tetra-methylene ether glycol), having a molecular weight of 2,000, and 0.25 moles of thiodiethanol, followed by a further reaction with one mole of propanol. This adduct was reacted with one mole of the triester of 3-mercaptopropionic acid with trimethylolpropane to produce a mercaptan-terminated urethane resin. This urethane resin had the curing agent reacted onto it by the addition of TDI/para-chlorothiophenol (1:1 molar ratio) curing agent adduct to the urethane resin. One hundred grams of the curing agent-modified urethane resin was neutralized with acetic acid and 0.25 moles of methyl iodide and blended with 20 grams of a 1:1 weight ratio mixture of triacrylamido-s-triazine and the diacrylate of DER 332 epoxy resin of Example XVII. The blend then was added to water to form an 8% non volatiles dispersion.

The electrocoating composition was cathodically electrodeposited onto steel panels in a manner similar to the previous Examples, washed with water, and baked at 205° C. for 25 minutes to yield a fully-cured coating on the panels.

EXAMPLE XXVI

A butylthioethylacrylate copolymer was synthesized by the solution polymerization of one mole of butyl acrylate, one mole of methylmethacrylate and one-half mole of the reaction products of butylthioethanol esterified with ethylacrylate, under standard solution polymerization conditions in 2-butoxy-ethanol-1 solvent and using one mole of thiolacetic acid as a chain transfer agent. The copolymer was hydrolyzed with acetic acid to convert the thiolacetic ester linkages into mercaptan groups. The curing agent of the previous Example then was reacted onto the copolymer.

The cathodic resin containing the curing agent was acidified with acetic acid and methyliodide, blended with triacrylamido-s-triazine, let down in water, and electrocoated onto steel panels in a manner similar to the previous Examples. Upon baking, a fully-cured coating with no mercaptan odor covered such panel.

DEMONSTRATION OF CORROSION-INHIBITION

EXAMPLE XXVII

The following four compositions were formulated for testing their corrosion-inhibiting properties.

A. Control A was a hydroxy-epoxy resin (DER 664 epoxy resin of Example XVI) used as a standard for this series of tests.

B. The reaction product of Control A and 2 moles of phenol and such is designed to simulate a coating wherein a phenol blocking agent would link into the coating.

C. The reaction product of Control A with 2 moles of thiophenol.

D. The reaction product of Control A with 2 moles of dodecylmercaptan.

Each of the foregoing compositions was dissolved in chloroform (10–20% solids) and steel panels dipped therein. The coated panels were air dried to yield continuous 1–2 mil thick coatings on the panels. A scribe was cut into the face of each of the coated panels and the scribed panels placed into a 5% NaCl salt solution for 48 hours (ASTM-D-1654-61). After the salt bath was completed, each panel was examined in order to determine the amount and severity of rusting that had taken place.

The panel coated with the coating of Control A was severely rusted in the scribe and also was severely rusted over the entire face of the panel. The panel with the coating of composition B showed severe undercutting or rust migration from the scribe underneath the coating and down the grain of the metal panel. The panel coated with the aliphatic mercaptan coating of composition D had moderate rust in the scribe and only slight rust undercutting. The panel coated with the aromatic mercaptan coating of composition C showed only a few small patches of rust in the scribe and no signs of rust undercutting.

The foregoing results clearly demonstrate the unexpectedly superior corrosion-protection which the mercaptan linkages formed from the carbamothioate curing agent contribute to the compounds of the present invention. Such corrosion protection can be particularly valuable in powder coatings and anodic electrocoatings uses of the present invention.

What is claimed is:

1. An electrocoating process for coating a substrate with an electrocoating composition dispersed in an aqueous electrocoating bath, which comprises:

electrodepositing said electrocoating composition onto said substrate, said composition comprising: a compound A containing at least about two functional groups each reactive with an isocyanate group, a compound B containing at least about two functional groups each reactive with a mercaptan group, and a carbamothioate curing agent adapted to generate a plurality of curing units upon being heated to above about critical temperature, said curing units containing at least two isocyanate groups and at least two mercaptan groups with at least one of said curing units containing at least two of said groups; and heating said coated substrate to a temperature above about said critical temperature to generate said plurality of curing units to cure said coating.

2. The electrocoating process of claim 1 wherein said substrate is an anode substrate and said composition is anodically electrodeposited onto said anode substrate.

3. The electrocoating process of claim 1 wherein said substrate is a cathode substrate and said composition is cathodically electrodeposited onto said cathode substrate.

4. The electrocoating process of claim 1 wherein said critical temperature is between about 100° and 250° C.

5. The electrocoating process of claim 1 wherein compound A and compound B are the same compound.

6. The electrocoating process of claim 1 wherein said curing agent is attached to compound A.

7. The electrocoating process of claim 1 wherein said curing unit is attached to compound B.

8. The electrocoating process of claim 5 wherein said curing agent is attached to said same compound.

9. The electrocoating process of claim 1 wherein at least one of said curing units contains at least 2 isocyanate groups and at least one of said curing units contains at least 2 mercaptan groups.

* * * * *

UNITED STATES PATENT AND TRADEMARK OFFICE
CERTIFICATE OF CORRECTION

PATENT NO. : 4,204,932
DATED : May 27, 1980
INVENTOR(S) : McGinniss, V. D. and Stevenson, D. R.

It is certified that error appears in the above-identified patent and that said Letters Patent are hereby corrected as shown below:

Col. 1., Line 56, Change "staple" to —stable—.

Col. 10., Line 21, Change "ciacrylate" to —diacrylate—.

Col. 10., Line 45, Change "Example VII" to —Example XVII—.

Signed and Sealed this

Thirtieth Day of December 1980

[SEAL]

Attest:

SIDNEY A. DIAMOND

Attesting Officer

Commissioner of Patents and Trademarks